UNITED STATES PATENT OFFICE.

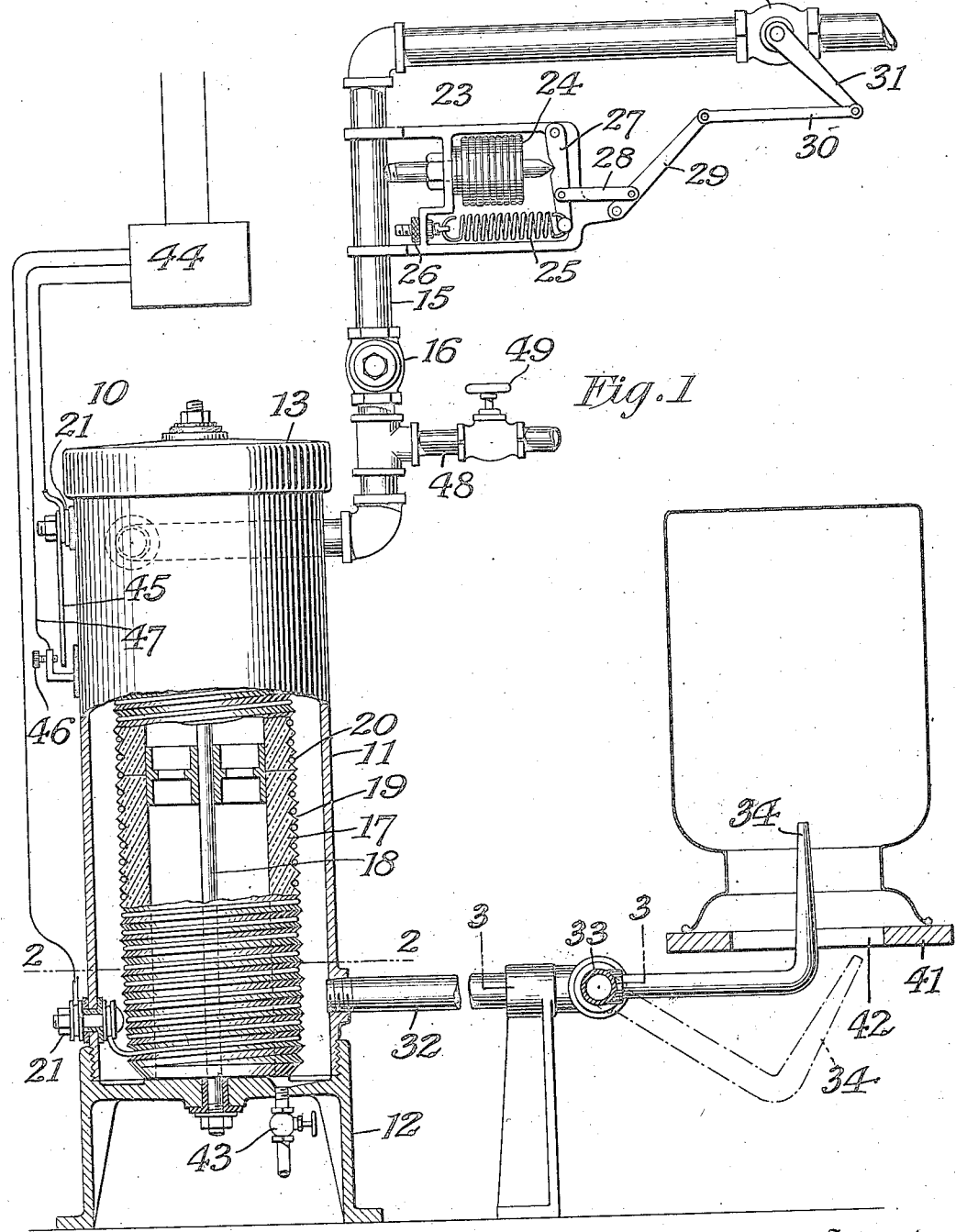

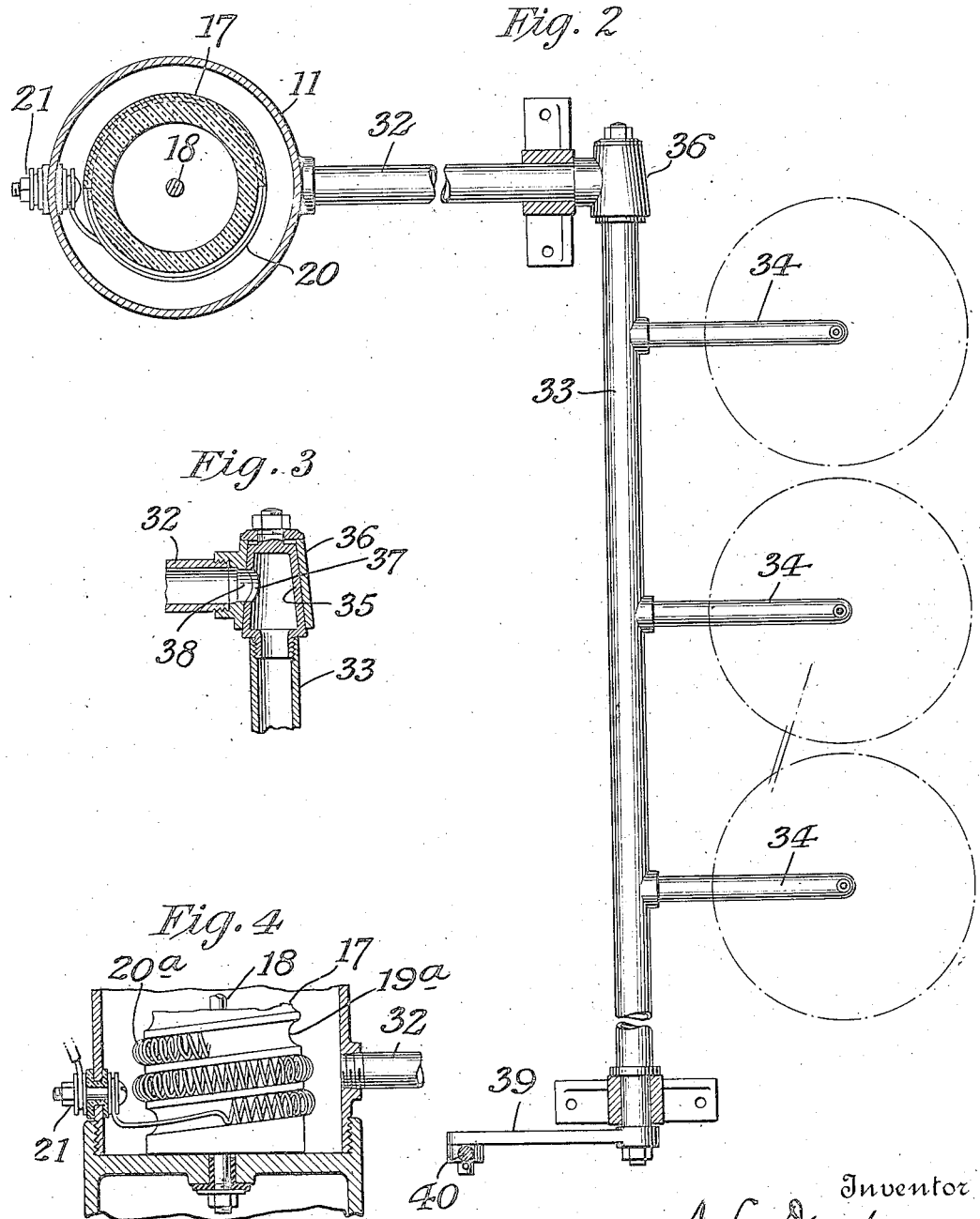

ARTHUR L. DUNHAM, OF NEW YORK, N. Y.

APPARATUS FOR AND METHOD OF STERILIZING MILK-CANS AND OTHER CONTAINERS.

1,398,503.  Specification of Letters Patent.  Patented Nov. 29, 1921.

Application filed October 12, 1916. Serial No. 125,167.

*To all whom it may concern:*

Be it known that I, ARTHUR L. DUNHAM, a citizen of the United States, residing at New York, borough and county of Richmond and State of New York, have invented certain new and useful Improvements in Apparatus for and Methods of Sterilizing Milk-Cans and Other Containers, of which the following is a full, clear, and exact description.

In handling milk for human consumption the desirability of sterilizing the containers is well understood. In the case of large containers, such as the cans in which milk is shipped in bulk, perfect sterilization has heretofore been difficult, if not impossible, of attainment, the "scalding" usually resorted to for the purpose being only partially effective. It is accordingly the object of my present invention to provide improved means and method by which adequate sterilization of large, as well as small, containers can be effected quickly and cheaply. To this and other ends the invention consists in the novel features hereinafter described.

In practising my invention according to the preferred manner the sterilizing medium employed is steam, which may be generated in any convenient manner, as, for example, in a suitable boiler. From the boiler the steam is led to a superheating device, preferably constructed as hereinafter described, and is there raised to a temperature considerably above the temperature of saturated steam,—say, for example, to several hundred degrees centigrade. From the superheating device the steam is discharged into the mouth of the receptacle or container, which is preferably inverted so that the superheated steam enters it from below and is caused to penetrate all parts of the receptacle. The latter is, however, open to the atmosphere, so that the steam acts at atmospheric pressure and not at a higher pressure, as is usually the case when using superheated steam. When the steam strikes the relatively cool walls of the receptacle it is instantly condensed, thereby liberating a large quantity of heat at exactly the point where it is needed; that is to say, upon the inner surface of the vessel, which surface is the place where the bacteria and other microörganisms to be destroyed are lodged. The infested inner surface of the receptacle is thus subjected to a large quantity of heat at a high temperature (at least as high as the boiling point of water) in a very short period of time, so that a space of a few seconds suffices to produce a sterilizing effect superior to that which would be produced by actual boiling of the vessel even for an extended period.

Convenient and effective apparatus for practising the method described above is illustrated in the accompanying drawing, in which—

Figure 1 shows the apparatus in side elevation, with portions of the casing of the superheating device broken away to show the inner parts.

Fig. 2 is a sectional plan view on line 2—2 of Fig. 1.

Fig. 3 is a section on line 3—3 of Fig. 1.

Fig. 4 is a detail sectional view of a modification.

The superheating device 10 comprises an outer casing or chamber 11, composed preferably of a piece of cylindrical iron pipe of suitable size, say six or eight inches in diameter and two feet in height, supported on a convenient base 12 which also serves as a closure for the bottom of the chamber. The upper end is closed by means of a removable cap 13, and at the upper end is a pipe 15 for connection with a steam generator, not shown. A valve 16 is provided in said pipe to cut off the supply of steam when desired.

Inside the casing is a superheating element comprising a cylindrical insulator 17, preferably formed of two hollow cup-shaped members placed end to end and held centrally in the casing by means of a longitudinal rod 18 tightly but removably fitted in apertures at the centers of the closures 12, 13. The insulating member is of earthenware or other material capable of withstanding high temperatures, and is formed on its outside with grooves, preferably a helical groove 19, in which a resistance wire 20 is placed. The terminals of the resistance are brought to binding posts 21 fixed in and insulated from the casing, for connection with a source of current, not shown. The casing 11 may be covered with a heat-insulating jacket, not shown.

To protect the superheater against excessive internal pressure I provide a valve 22 in pipe 15, and automatic operating mechanism 23. The latter comprises an expansible and contractible bellows-like chamber 24 in communication with pipe 15 (and hence with chamber 11) on the left of valve 22. When the pressure in the superheater is sufficient to overcome the tension of the spring 25 (adjustable by means of the nut 26) the bellows expands and through the agency of lever 27, link 28, lever 29, link 30 and arm 31, operates the valve 22 and diminishes the flow of steam therethrough. As the pressure falls the reverse operation takes place and the flow is increased. Thus a substantially constant pressure, determined by the adjustment of spring 25, is maintained in the superheater.

At the end of the casing opposite to the inlet pipe 15 is an outlet pipe 32, connected by a pivot joint to a horizontal pipe 33 provided with one or more nozzles 34. Preferably the pivot joint mentioned is also a valve, for example as shown in Fig. 3, so that when the pipe 33 and nozzle 34 are depressed, as shown in dotted lines in Fig. 1, the flow of steam will be cut off. For this purpose the hollow pivot 35, of conical form, and the conical seat 36, are provided with ports 37, 38, which are out of register when the nozzles are depressed. For convenient manipulation the pipe 33 is provided with a rearwardly extending arm 39, Fig. 2, which is pivotally connected to a vertical rod 40 constituting a handle extending up to a position convenient to the operator. Above the pipe 33 is a platform or shelf 41, Fig. 1, having openings 42 into which the nozzles project when in raised or upper position. A drain cock 43 is provided to empty the casing 11 of condensed steam.

To protect the superheater from excessive heat an automatic switch indicated diagrammatically at 44 is provided, under the control of a thermostat 45. The latter is mounted on the upper binding post so as to receive heat by direct conduction from the interior of chamber 11. When the temperature rises to a predetermined point (dependent upon the adjustment of screw-contact 46) the bar 45 is flexed into contact with the screw 46, thereby establishing a circuit through wire 47 which operates the circuit-breaker or switch mechanism 44 and cuts off the current from the heating resistance 20. When the temperature falls the circuit mentioned is broken and the circuit through resistance 20 is reëstablished. As the construction and operation of thermostatically controlled switches or circuit-breakers are well known it is unnecessary to illustrate and describe the same herein.

In the modification illustrated in Fig. 4 the resistance 20ª is in the form of a helical coil which is itself coiled or wrapped helically around the insulating member 17, in a helical groove 19ª of suitable depth and width.

When current is supplied to the resistance 20 the interior parts of the superheating device are highly heated, say to 500° or 600° C. Steam flowing through the annular space or chamber between the heating element and the walls if the casing is thus superheated. Inasmuch as the superheating takes place in a chamber separate from the boiler, so that the steam is not in contact with the water from which it is evaporated, the steam is not saturated; and since the superheated steam escapes freely from the nozzles when the device is in operation the pressure of the steam is translated, so to speak, into velocity, so that the steam is discharged from the nozzles at high velocity.

The nozzles 34 being depressed, so that no steam escapes, the cans or other vessels to be sterilized are inverted over the openings 42. The nozzles are then swung up, whereupon superheated steam is discharged into the cans. Having high velocity, the steam penetrates all parts of the interior of the receptacle, and striking the walls of the cans liberates its heat thereon and thus kills any microörganisms that may be present by subjecting them to the high temperature of the steam. The action is extremely rapid, a few seconds being usually sufficient to render the inner surfaces of the cans completely sterile. The nozzles are then depressed and the cans removed, leaving the apparatus ready for the next lot of cans.

The superheater described is also useful for supplying superheated steam to an autoclave or other apparatus in which steam is used under pressure.

A source of compressed air (not shown) may be connected to the superheater by means of a pipe 48, having a valve 49, connected to the pipe 15 between the valve 16 and the chamber 11. Upon closing valve 16 and opening valve 49 air under pressure is delivered to the chamber and after being heated to a high temperature is discharged from the nozzles 34 for drying the interior of the cans or for other purposes.

It is to be understood that the invention is not limited to the details of apparatus and procedure specifically described herein, but can be practised in other ways without departure from its spirit as defined by the appended claims.

What I claim is:

1. The herein described method of sterilizing which comprises increasing the heat of steam without materially increasing its pressure by superheating steam away from the point of its generation and directing it at low pressure onto the article to be sterilized.

2. The method of sterilizing by subjecting the article, in the presence of moisture, to a temperature at or above the boiling point of water substantially at atmospheric pressure, comprising superheating steam under pressure, discharging the superheated steam at high velocity against the article to be sterilized, whereby the steam coming into contact with the article gives up heat directly to the surface thereof, then heating air under pressure and discharging it upon the article whereby the hot air in motion rapidly dries the sterilized surfaces.

3. An apparatus for sterilizing comprising a closed superheating chamber having a steam inlet and a steam outlet, means associated with said chamber for superheating steam delivered thereto without materially increasing its pressure, and means connected with said outlet for directing the superheated steam onto the surface of the article to be sterilized.

4. An apparatus for sterilizing comprising a closed superheating chamber having a steam inlet and a steam outlet, means associated with said chamber for superheating steam delivered thereto without materially increasing its pressure, and means connected with said outlet for directing the superheated steam onto the surface of the article to be sterilized, said means comprising a rotary valve and a swinging nozzle connected therewith and arranged to actuate said valve.

5. In a sterilizing apparatus, in combination, a closed superheating chamber having a steam inlet and a steam outlet, means for delivering steam or air at will to said steam inlet, and means connected with the steam outlet for directing superheated steam or heated air at high velocity upon the article to be sterilized.

6. In a sterilizing apparatus, in combination, a closed superheating chamber having a steam inlet and a steam outlet, means for delivering steam to said inlet, automatic mechanism associated with said means to maintain a safe and substantially constant pressure in said chamber, and means connected with the steam outlet for directing the superheated steam upon the article to be sterilized.

7. In a sterilizing apparatus, in combination, a closed superheating chamber having a steam inlet and a steam outlet, means for delivering steam to said inlet, automatic mechanism associated with said means to maintain a safe pressure in said superheating chamber, means for heating the steam in said chamber, thermostatic mechanism associated with said heating means to maintain a substantially constant temperature in the superheating chamber, and means connected with said steam outlet for directing the superheated steam upon the article to be sterilized.

In testimony whereof I hereunto affix my signature.

ARTHUR L. DUNHAM.